US006412810B1

(12) United States Patent
Wipasuramonton et al.

(10) Patent No.: US 6,412,810 B1
(45) Date of Patent: Jul. 2, 2002

(54) INFLATABLE SIDE AIR BAG CURTAIN MODULE

(75) Inventors: Pongdet P. Wipasuramonton, Rochester; Samuel Wong, Troy; Brian J. Bailey, Romeo; Robert Tobian, New Baltimore, all of MI (US)

(73) Assignee: Breed AutomotiveTechnology, Inc., Lakeland, FL (US)

( * ) Notice: Subject to any disclaimer, the term of this patent is extended or adjusted under 35 U.S.C. 154(b) by 0 days.

(21) Appl. No.: 09/428,963

(22) Filed: Nov. 4, 1999

(51) Int. Cl.[7] .............................................. B60R 21/22
(52) U.S. Cl. ................ 280/730.2; 280/728.2; 280/730.1
(58) Field of Search ..................... 280/730.2, 730.1, 280/728.2

(56) References Cited

U.S. PATENT DOCUMENTS

| 5,322,322 A | * | 6/1994 | Bark et al. ................ 280/730.2 |
| 5,366,241 A | * | 11/1994 | Kithil ........................ 280/735 |
| 5,540,459 A | * | 7/1996 | Hayashi et al. ............. 277/205 |
| 5,588,672 A | * | 12/1996 | Karlow et al. ............ 280/730.2 |
| 5,599,042 A | * | 2/1997 | Shyr et al. ............... 280/730.1 |
| 5,605,346 A | * | 2/1997 | Chueng et al. .......... 280/728.2 |
| 5,681,055 A | * | 10/1997 | Green et al. ............. 280/728.2 |
| 5,791,683 A | * | 8/1998 | Shibata et al. ........... 280/730.2 |
| 5,806,884 A | * | 9/1998 | Johnson et al. ............ 280/736 |
| 5,820,162 A | * | 10/1998 | Fink ........................... 280/742 |
| 5,884,937 A | * | 3/1999 | Yamada ................... 280/730.2 |
| 5,899,486 A | * | 5/1999 | Ibe ........................... 280/728.2 |
| 5,907,120 A | * | 5/1999 | Mooney et al. ............. 102/521 |
| 5,921,575 A | * | 7/1999 | Kretschmer et al. ...... 280/728.2 |
| 5,924,723 A | * | 7/1999 | Brantman et al. ........ 280/730.2 |
| 5,957,487 A | * | 9/1999 | Stutz ....................... 280/730.2 |
| 6,022,044 A | * | 2/2000 | Cherry .................... 280/730.2 |
| 6,082,761 A | * | 7/2000 | Kato et al. ............... 280/730.2 |
| 6,102,434 A | * | 8/2000 | Ohlert et al. ............ 280/728.2 |
| 6,103,984 A | * | 8/2000 | Bowers et al. ........... 200/730.2 |
| 6,106,000 A | * | 8/2000 | Stewart .................... 280/728.2 |
| 6,106,007 A | * | 8/2000 | Kretschmer et al. ...... 280/730.2 |

FOREIGN PATENT DOCUMENTS

| DE | 197 12 039 A1 | 11/1997 |
| DE | 297 18 305 | 2/1998 |
| GB | 2 309 942 A | 8/1997 |
| GB | 2 319 751 A | 6/1998 |
| GB | 2 334 242 A | 8/1999 |
| JP | 10203288 | 8/1998 |

* cited by examiner

*Primary Examiner*—Brian L. Johnson
*Assistant Examiner*—Deanna Draper
(74) *Attorney, Agent, or Firm*—Markell Seitzman (57) ABSTRACT

An air bag comprising at least one inflatable portion; a connecting portion located above the inflatable portion; a mounting rod connected to the connecting portion, the mounting rod adapted to be connected to a cooperating part of a vehicle. In another embodiment of the invention, the air bag includes a plurality of inflatable portions and a center uninflatable portion. The various inflatable portions are interconnected by a manifold or central passage.

22 Claims, 13 Drawing Sheets

INFLATABLE SIDE AIR BAG CURTAIN MODULE

BACKGROUND AND SUMMARY OF THE INVENTION

The invention generally relates to a side impact or rollover air bag system used within an automotive vehicle.

The prior art is replete with various side impact or rollover air bags (also referred to as side curtains or curtain air bags) that when deployed provide a cushion between a side of a vehicle and the side (head and upper torso) of an occupant. In the context of an air bag that is used for rollover protection, the bag must have a very low (including zero) gas permeability as it must remain inflated for a relatively long period of time (a few seconds), in comparison with the much shorter time period of a side impact crash which is measured in milliseconds. The characteristic of low permeability is achieved by coating the fabric of the air bag with material such as silicone or polyurethane. The prior art shows side impact air bags of various sizes. Some only cover the inside of one vehicle door while others extend across most of the side of the vehicle from the A-pillar, across to the B-pillar, to the C-pillar.

Most usually, the air bag is installed along the roof rail of the vehicle and stored within a breakable housing (or cover or trim piece). As the air bag inflates the housing (cover or trim piece) breaks along a predetermined tear line and the bag deploys downwardly. The height of a typical side curtain impact or rollover air bag extends from the roof rail to just below the shoulder of a $5^{th}$ percentile female sized occupant.

In the present invention the air bag housing (cover or trim) is formed in part by the headliner of the vehicle. A corresponding edge of the headliner is pushed away as the bag expands, permitting further expansion of the air bag.

The prior art shows that the air bag can be secured directly to the roof rail. This mode of attachment often requires the use of a plurality of discrete, and often expensive, fasteners that are installed on the final vehicle assembly line. As can be appreciated, attaching many fasteners is labor intensive as well as expensive. In one embodiment of the invention the air bag is secured to a mounting rail or rod. AS used in the present invention, the rod can be circular or oval in cross-section or a flat (metal) strip. The mounting rail or rod is easily and quickly attached to the vehicle using a quick-lock type of connector providing efficiencies in installation. The mounting rail can be flush with the side of the vehicle or spaced therefrom to position the inflating air bag from the side of the vehicle. In this manner, the air bag can deploy, that is, inflate over adjacent trim parts and avoid being obstructed by these parts.

It is an object of the present invention to provide a more efficient air bag and one that is more easily assembled and installed within a vehicle.

Accordingly the invention comprises: an air bag comprising at least one inflatable portion; a connecting portion located above the inflatable portion; a mounting rod is connected to the connecting portion, the mounting rod is adapted to be connected to a cooperating part of a vehicle. In another embodiment of the invention, the air bag includes a plurality of inflatable portions and a center uninflatable portion. The various inflatable portions are optionally interconnected by a manifold or central passage.

Many other objects and purposes of the invention will be clear from the following detailed description of the drawings.

BRIEF DESCRIPTION OF THE DRAWINGS

In the drawings:

FIG. 6b is a cross-sectional view through Section 6b—6b of FIG. 6a.

DETAILED DESCRIPTION OF THE DRAWINGS

Figure 1:
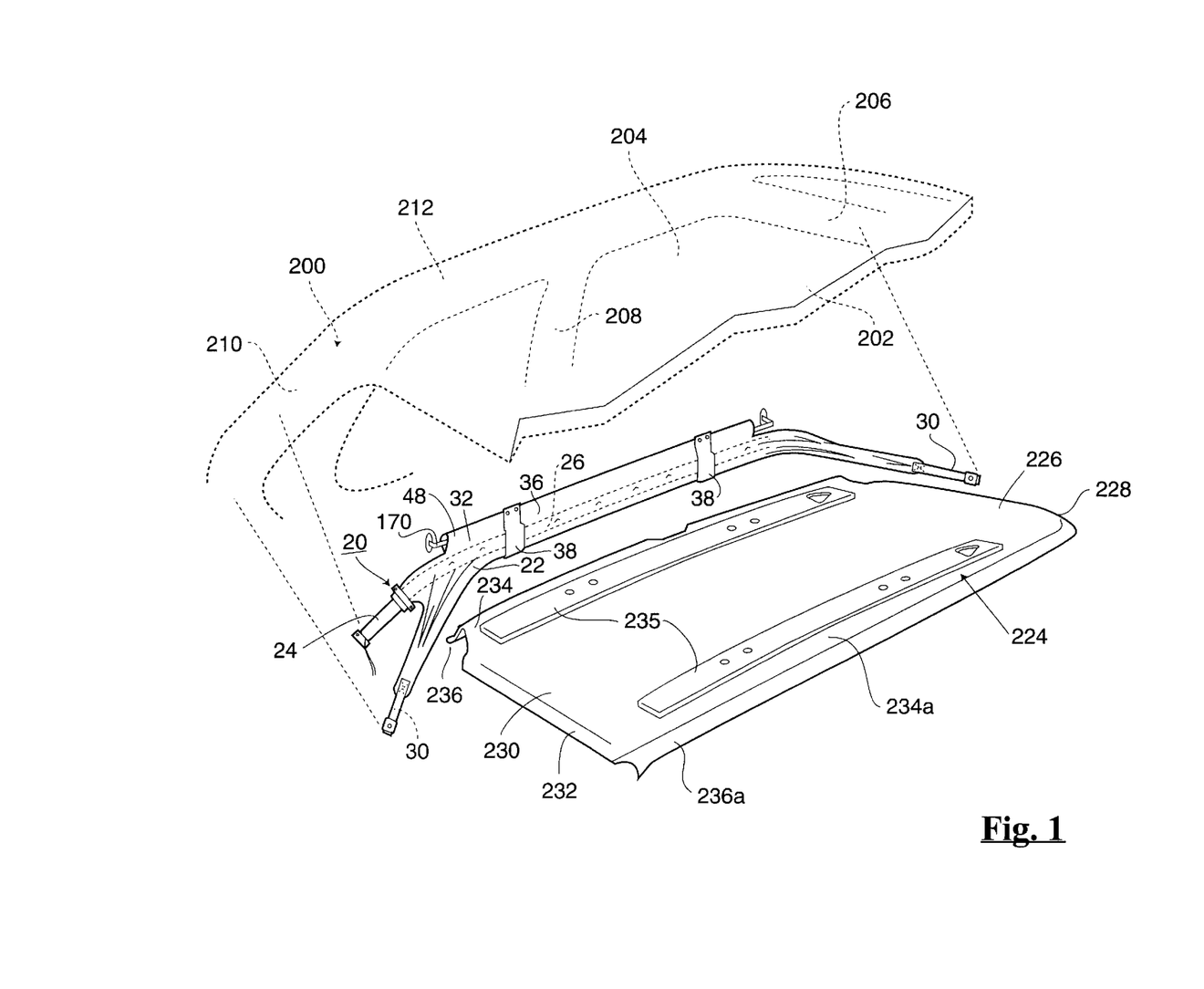
FIG. 1 illustrates an exploded partial assembly view of a side curtain air bag system.

FIG. 1 shows a side curtain air bag system 20 used within a portion of a passenger compartment of a vehicle 200. The vehicle includes a roof 202 and two sides 204 (only one is shown in FIG. 1). Situated along each side 204 is a plurality of pillars such as the forward or A-pillar 206, a middle or B-pillar 208 and a rear or C-pillar 210. The vehicle includes a roof rail 212, on either side, in the general vicinity of the juncture of the vehicle side and roof. A headliner 224 is secured to the roof of the vehicle 200. The right and lefthand sides of the headliner enclose an air bag mounted on the right and left side of the vehicle. As illustrated, the headliner 224 extends across the roof of the vehicle and encloses the air bags situated along the right and left-hand roof rails.

The major components of system 20 comprise two air bags 22 situated on each side of the vehicle mounted to and adjacent the roof rail 212. The left-hand side air bag 22 is shown in its folded, pre-inflated condition in FIG. 1. The right-hand side air bag is symmetrically placed and of similar construction. An inflator 24 provides inflation gas to a flexible tube 26 (also see FIG. 3). The tube extends into a respective air bag 22 in order to communicate inflation gas throughout the air bag. The following discussion is directed to the left-side air bag or system 20 and is applicable to both the right-hand air bag and system. The flexible tube 26 includes a plurality of openings 28 across its length to distribute inflation gas to the air bag. As also illustrated in FIG. 1, lower portions of the air bag 22 are secured to the A and C-pillars by straps or tethers 30 (also see FIGS. 3 and 6). These tethers prohibit the lower portions of the inflating air bag from moving away from the side of the vehicle and hold the bottom of the bag down when loaded by an occupant.

Figure 8:
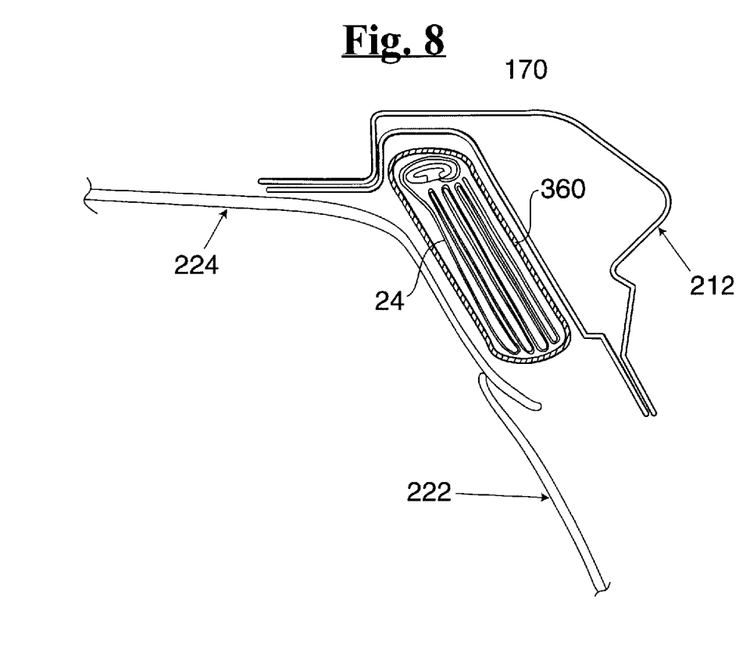
FIGS. 8 and 8a show more details of an inflated and uninflated air bag.

In one embodiment the top 32 of the air bag, as shown in FIG. 1, includes a loop or tube 48 into which is received a rail 170 (also discussed in relation to FIG. 3) which permits the air bag to be easily and quickly secured at selected locations to or near the roof rail 212. The mid-portion 36 of the folded air bag can be held in its pre-inflated, folded state relative to the roof rail 212 by breakaway brackets or straps 38 which, when broken, allow the air bag to deploy downwardly (shown by dotted lines in FIG. 6) or by trim or housing parts or by a wrapping 360, as shown in FIG. 8.

Figure 6:
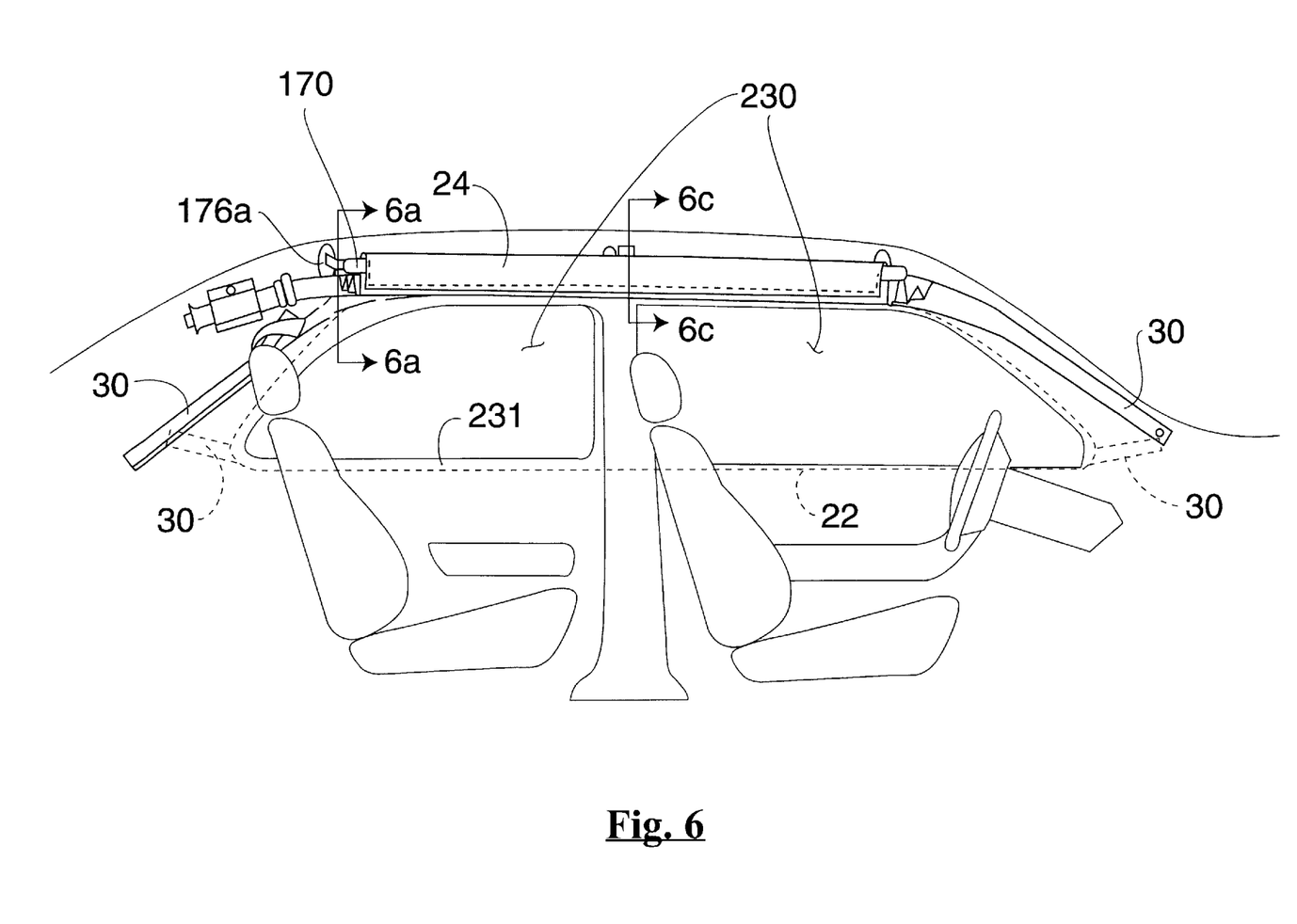
FIG. 6 illustrates a side cross-sectional view of the interior of a vehicle showing the air bag in a folded configuration and installed adjacent a roof rail of the vehicle. The outline of an inflated air bag is also shown in phantom line.

FIG. 6 shows the air bag 22 deployed or inflated and positioned in front of and covering portions of the A, B and C-pillars as well as portions of the vehicle's windows 230 and window sill 231.

Figure 2:
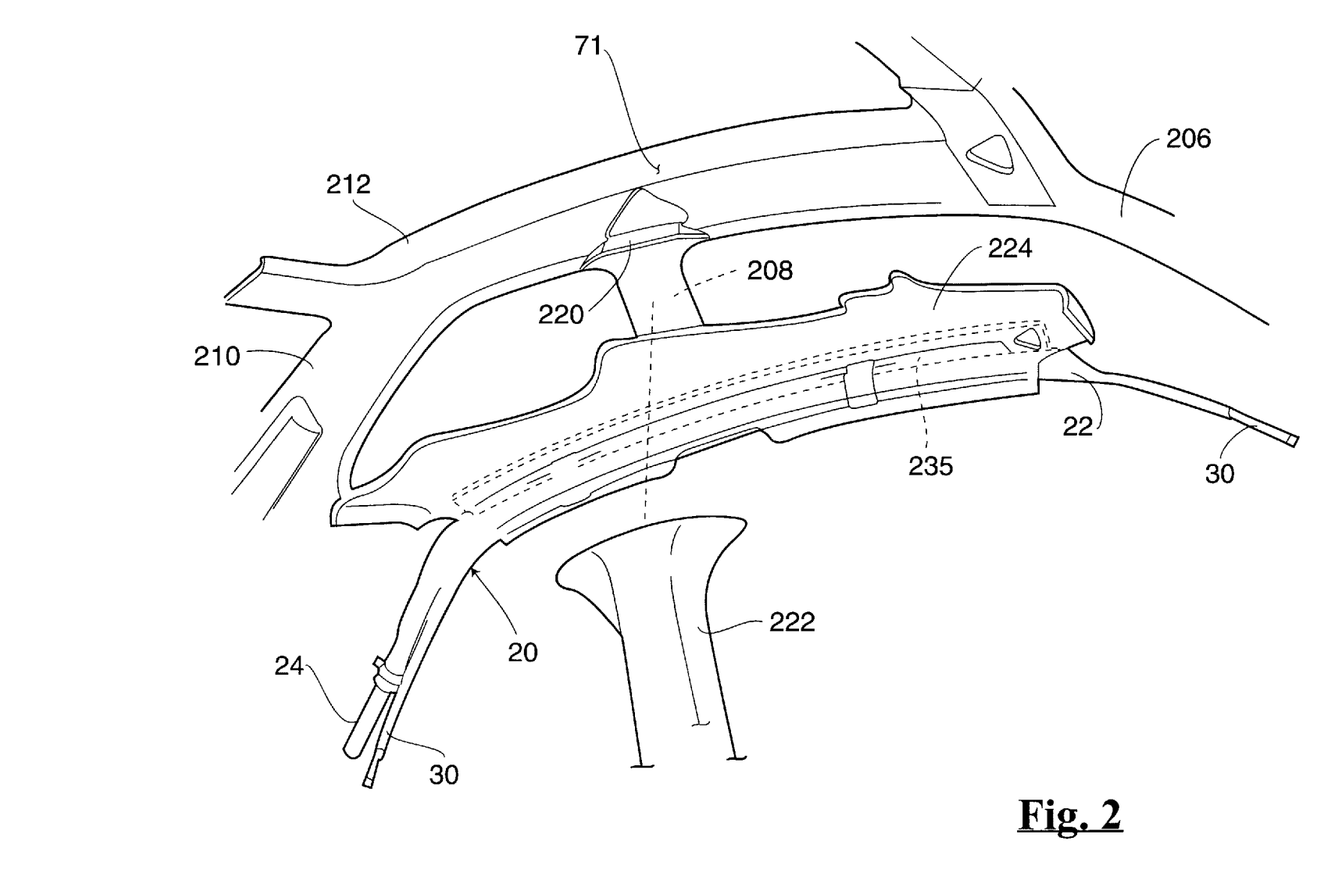
FIG. 2 is a partial isometric view from within the vehicle.
Figure 2A:
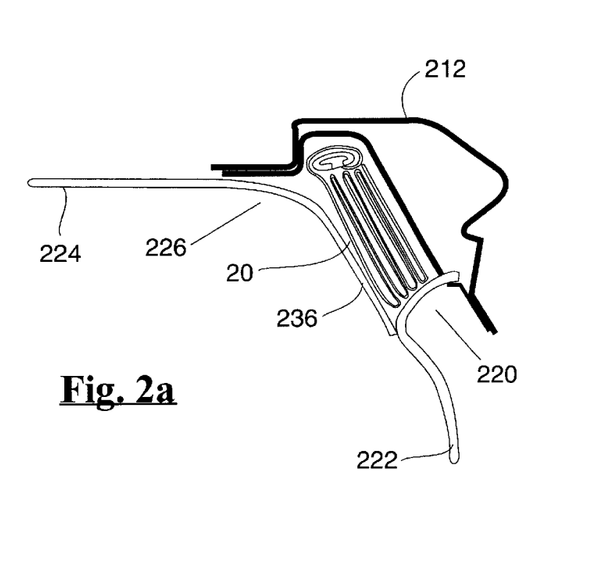
FIG. 2a is a view showing a headliner trim as part of a roof rail.
Figure 2B:
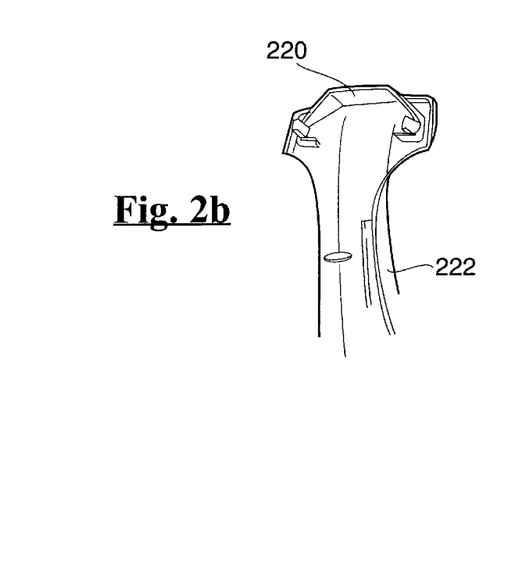
FIG. 2b is a rear view of a B-pillar trim panel.
Figure 2C:
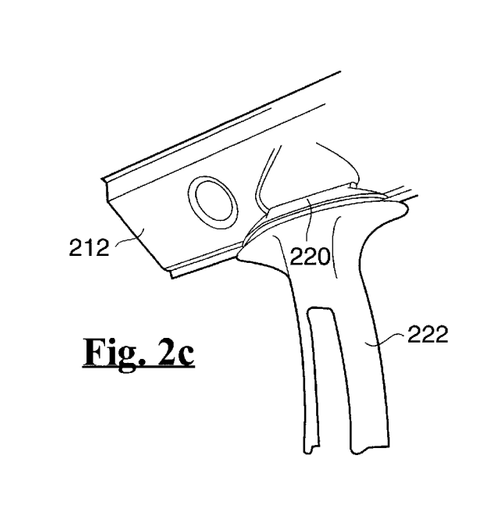
FIG. 2c shows the B-pillar trim panel mounted to the B-pillar and roof rail.

Reference is now made to FIG. 2 which is an isometric view of a part of the interior of the vehicle and shows various pillars 206, 208 and 210, as well as the roof rail 212. The B-pillar 208 is covered by a B-pillar trim panel 222 which includes a deployment guide 220 on the rear side thereof (the deployment guide is also shown in FIGS. 2a through 2c). In FIG. 2 the B-pillar trim panel is shown spaced from the B-pillar 208. For the purpose of illustration, the headliner 224, inflator 24 and air bag 20 are shown spaced apart from the roof rail and pillars. It should be understood that the air bag, inflator and headliner are mounted in the manner shown in FIG. 1. As can also be seen in FIG. 2, a portion of the headliner 224 hides the folded air bag 20 from view.

Reference is again made to FIGS. 1 and 2 as well as FIG. 2a. As mentioned earlier, the headliner 224 (or headliner trim) is sized to fit across the entire interior roof of the vehicle. The headliner 224 includes a front 226 having a downward curving front end 228. The rear end 230 of the headliner trim also includes a downward curving portion 232. The curved portions 228 and 232 of the headliner trim 224 provide for a smooth transition into other trim pieces within the passenger compartment near the windshield and rear window. The right and left-hand edges of the trim are curved downwardly. As can be seen from FIGS. 1, 2 and 2a, the left-hand portion 234 of the headliner trim 224 is curved downwardly and includes a curved and extending edge 236. The right-hand side 234a and edge 236a are similarly shaped. Each side of the headliner 224 may also include a reinforcement bar or section 235 secured to the roof. As can be seen, the bar 235 is located near the side edges of the headliner 224. An outboard side or edge of each bar 235 defines a fulcrum about which the sides 234 and 234a of the headliners deform and each air bag 22 inflates.

Figure 3:
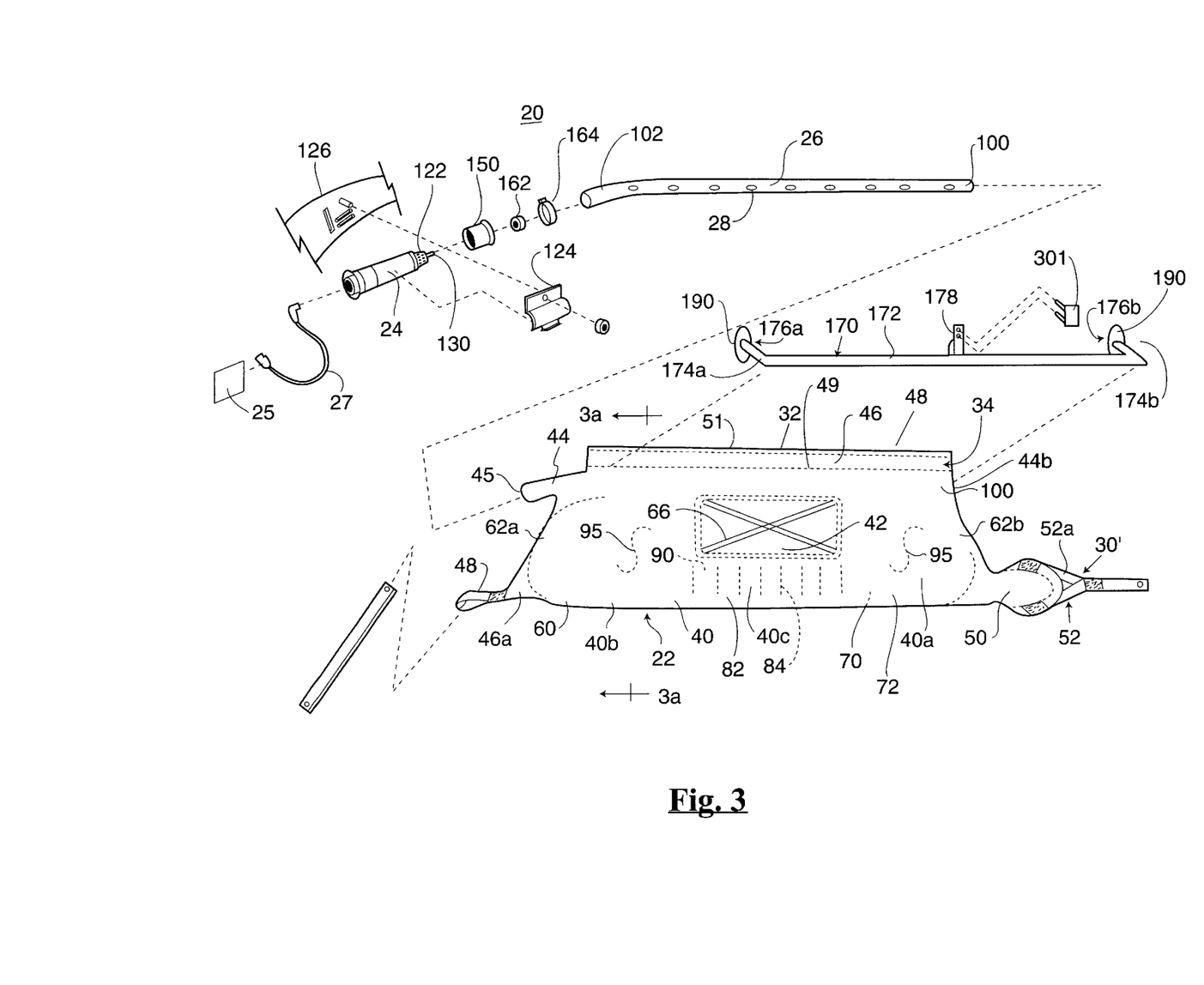
FIG. 3 shows further details of a side curtain air bag system.

FIGS. 3 and 3a show further details of the system 20. More particularly, the air bag 22 is shown in its inflated state. (FIG. 6 also shows the air bag inflated within a vehicle.). The air bag 22 includes an inflatable, elongated cushion portion generally shown as 40. As illustrated, the inflatable portion 40 of the air bag comprises a forward cushion portion 40a, a rear cushion portion 40b and a center cushion portion 40c. Situated between the inflatable front and rear cushion portions 40a and 40b respectively and above the inflatable center portion 40c is an uninflatable portion 42. In another embodiment (see FIG. 11), the center portion (of FIG. 3) is eliminated and the size of the uninflated portion 42 extends across the region occupied by the center portion 40c. The top 32 of the air bag illustrated in FIG. 3 is formed into the tubular passage 46 to receive the rod 170.

The air bag 22 can be made from one or more pieces of fabric to provide the desired configuration. The air bag illustrated in the various figures is made of a single panel of material joined at its top and sides to define the inflatable portions. The single or multiple pieces of fabric forming the air bag are sewn together or bonded, such as by using radio frequency waves. The air bag 22 includes an outer or exterior side 70 that lies adjacent to a corresponding vehicle side 71 (see FIG. 2) when inflated and an inner or interior side 72 that lies adjacent to the occupant to be protected. Various types of material can be used to construct the air bag 22. For example, the material may include a woven nylon material with denier ranging from 210 to 630. The woven fabric can be coated with urethane or silicone to reduce the permeability of the fabric to about zero. A urethane coating is preferred if the bag is joined by RF bonding. The bottom 60 (see FIG. 3) of the air bag 22 can be formed as a folded or looped edge when using a single piece of material or the bottom will be formed by sewing two mating edges of two separate panels of material. The edges 62a and 62b of the air bag are sewn together or bonded together to enclose the air bag.

Figure 11:
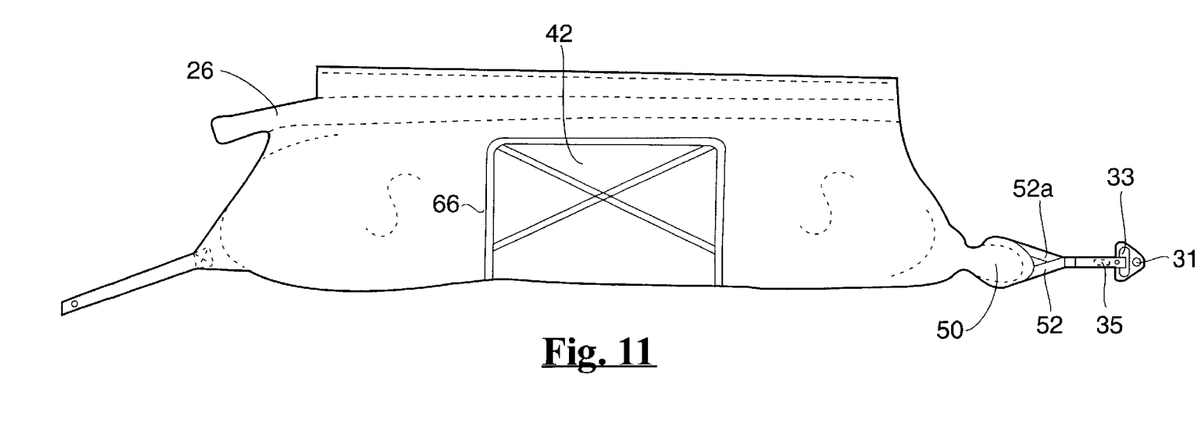
FIG. 11 shows an alternate embodiment of the invention.

The uninflatable portion 42 of the air bag is formed by a series of bonds or seams such as 66 joining the fabric (that forms the outer side 70 to the inner side 72 of the air bag). FIG. 11 shows an air bag 22 with a larger uninflated portion 42.

The center inflatable portion 40c can be formed as a single inflatable chamber, portion or passage 42, linking portions 40a and 40b of the air bag. Alternately, portion 42 can be formed into a plurality of elongated cells 82 (shown in phantom line, see FIG. 3). Each cell is separated by an additional seam or weld 84, shown in phantom line. The top of each of cell 82 (the seams or welds 84) is spaced from the bottom of the uninflatable portion 40c. This spacing provides a central passage 90, also shown in phantom line, through which inflation gas flows. As such, passage 90 functions as a manifold communicating the cells and cushion portions 40a and 40b together. However, as can be seen, the tube 44 also serves to communicate inflation gas to the inflatable portions 40a and 40c of the bag. Each of the portions 40a and 40b can be subdivided by adding a seam or joint 95.

The air bag 22 of FIG. 3 also shows an alternate tether arrangement that can, if desired, be used with the bag of FIG. 1. More particularly, the lower left rear corner 46a of the air bag includes a strap 48 sewn thereto and formed into a loop. The looped strap 48 forms an alternate tether mechanism replacing the straight strap or tether 30 shown above. Additionally, the forward cushion portion 40a of the air bag 22 may include an optional forwardly extending inflatable section 50, which is associated with and secured to tether 30'. This inflatable section 50 extends generally to the vehicle's A-pillar. If the bag 22 does not include section 50, the tether arrangement 30' would be attached to the lower right-hand corner or a given distance above the bottom edge of cushion portion 40a as shown previously in FIG. 1. This alternate tether 30' may comprise a plurality of angled straps such as 52 and 52a secured to the border of the air bag in a v-shape arrangement. This construction provides added stability of the bag 22 and, upon inflation, the inflatable portion 50 tends to more quickly tighten the tether (30 or 30') attached thereto. One or both of the straps 52 and/or 52a extend outwardly and include provision to secure the tether 30' to the vehicle. The mode of securing any of the tethers mentioned above may include forming a fastener opening in an end of the tether or in a reinforced end or attaching the end of the tether to a metal anchor plate 33 that includes a fastener opening 31 by looping an end of a tether strap through an eyelet 33, as shown in FIG. 11, and sewing the strap to itself (see sew stitches 35).

Returning to FIG. 3, the air bag 22 also includes a tubular portion or inlet 44 having an opening 45. A flexible reinforced hose such as a narrow diameter fire hose 26 (an annular rubber wall and woven exterior reinforced casing) having a plurality of openings 28 is inserted within the bag 22 and positioned just below a seam 49 forming the tubular portion 48. End 100 of the hose or tube 26 may optionally be closed. The opposite or back end 102 of the tube, extends to the opening 45 where the inlet 44 and this end of the tube 102 are secured to the inflator 24 by a clamp 164 or other clamping means.

Figure 4:
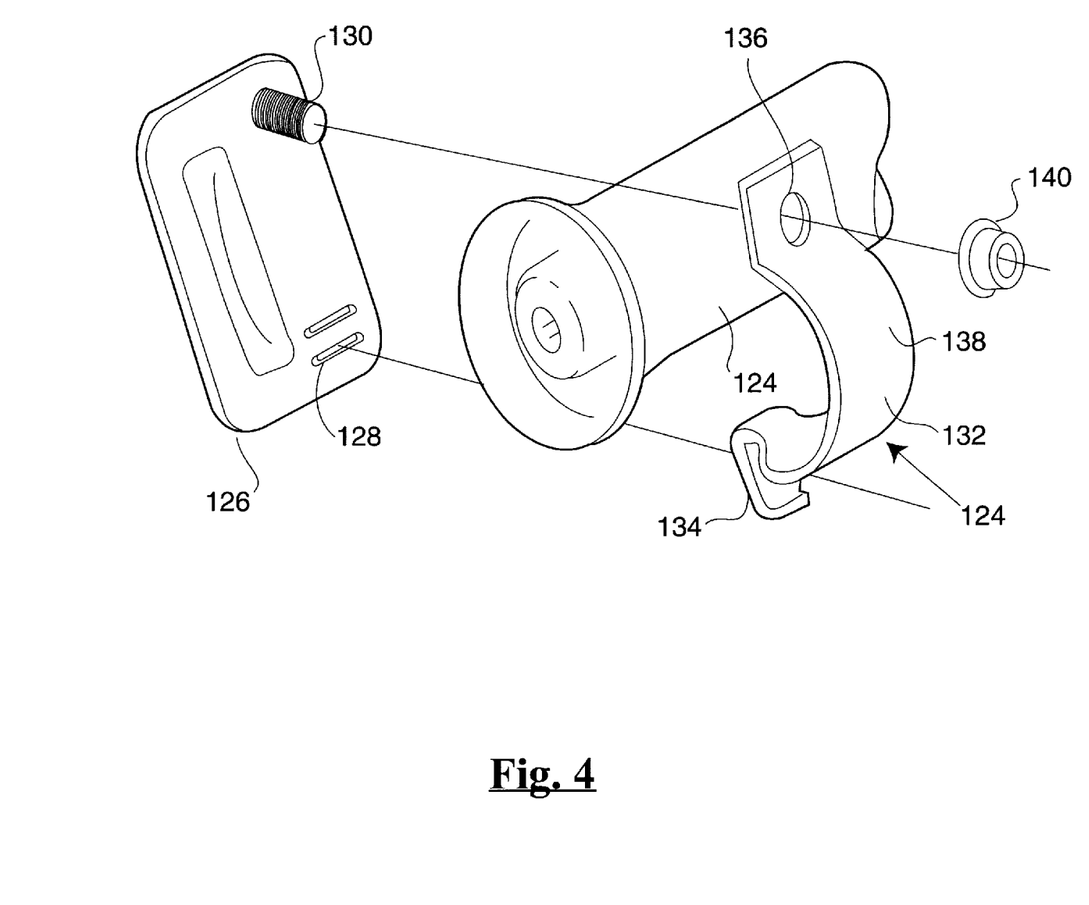
FIG. 4 illustrates an inflator and attachment hardware.

The inflator 24 of necessity includes one exit port or a plurality of exit ports 122 through which inflation gas exits the inflator 24. In the illustrated embodiment, the inflator 24 is positioned proximate the C-pillar 210 and secured thereto by a bracket assembly 124. The bracket assembly 124 is shown in greater detail in FIG. 4. The bracket assembly 124 includes a mounting bracket 126 having one or more slots 128 and a threaded stud 130. The bracket assembly additionally includes a curved, typically metal, strap 132 having a hook 134 at one end and opening 136 at its other end. The hook 134 is received within one or the other of the slots 128; the inflator 124 is secured within the curved portion 138 of the strap 132 and secured to the bracket or plate 126 by a fastener 140.

Figure 5:
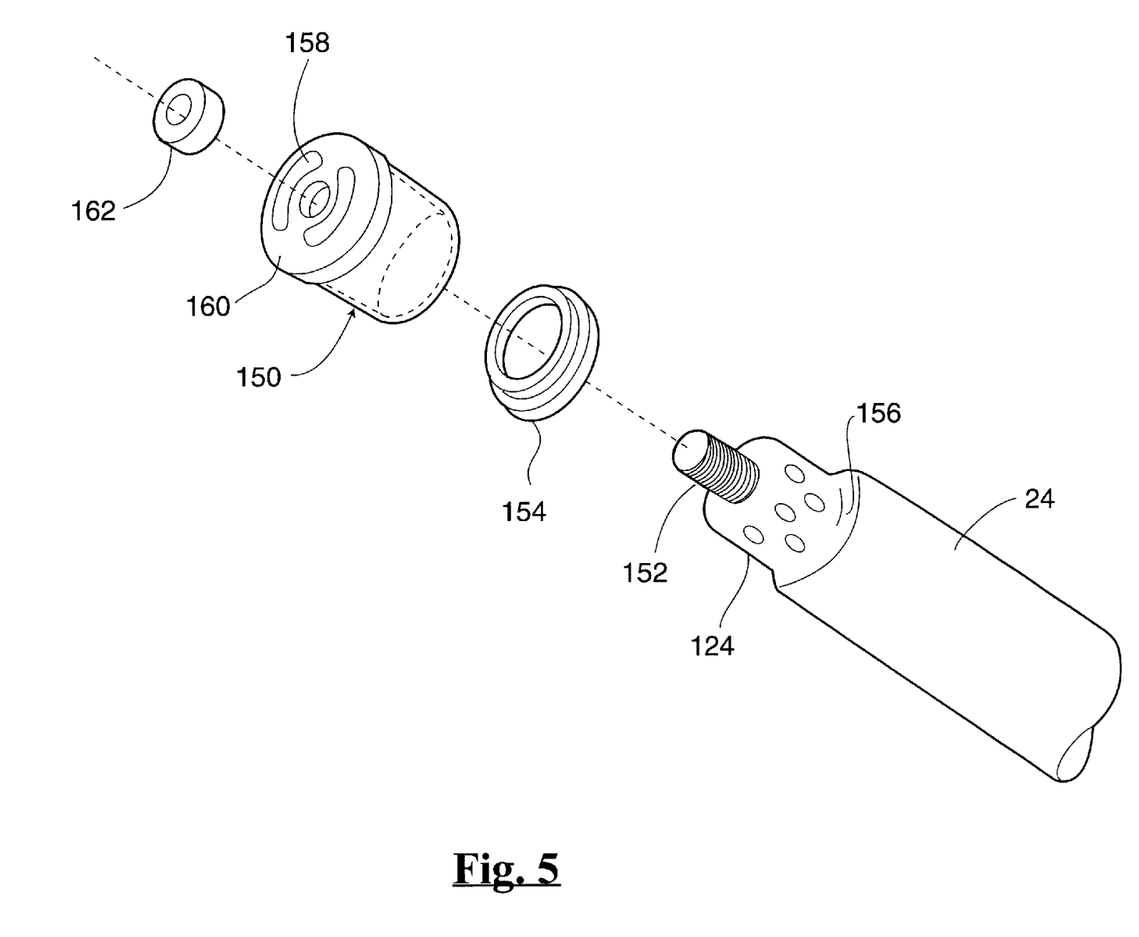
FIG. 5 shows an axial flow adapter for an inflator.

It is preferable that the exit port(s) 122 of the inflator be aligned such that the inflation gas exits longitudinally directly into the hose 26. If, however, the exit ports are radially aligned, an adapter such as 150 can be secured to the inflator (also shown in FIG. 5) to redirect the inflation flow from radial to longitudinal. As can be seen, the inflator of FIG. 5 illustrates a threaded stud 152. An adapter seal 154 is seated about a narrow neck 156 of the inflator and the flow adapter 150 is positioned about the inflator and upon the seal. The adapter 150 includes a hollow body with one or more longitudinally directed flow ports 158 on an end surface 160 thereof. The adapter and seal are secured to the inflator by a nut 162. The inflator 24 receives an activation signal from various crash sensors and ECU 25 through wire 27 (see FIG. 3).

The end 102 of hose 26 is secured either directly to the inflator or, if an adapter 150 is used, the hose is secured upon the adapter (as shown in the upper portion of FIG. 3). The hose 26 and end of the tubular inlet 44 of the bag are maintained in place by a clamp 164. In the finished assembly, the end 102 of the hose 26 does not extend out from the inlet 44.

As previously mentioned, the air bag 20 illustrated in FIGS. 1 and 6 is secured to the roof rail of the vehicle by the mounting rail or rod 170. The mounting rail supports the air bag across its entire length and provides a means to easily and quickly secure and mount the air bag to the roof rail, or other mounting location in the vehicle. The mounting rail 170 is shaped to generally conform to the shape of that portion of the vehicle to which it is mounted. The prior art side impact or side cushion air bags are secured to the roof rail by a plurality of discrete fasteners which, as mentioned, is time consuming. The mounting rail 170 (see FIG. 3) includes a center portion 172 and perpendicularly extending ends 174a and 174b. The length of these extending ends provides the ability to space the center portion 172 of the rail 170 a determinable distance from the mounting location such as the roof rail or the side of the vehicle.

Associated with or part of each end 174a and 174b is a respective quick-connect connector such as a snap-in or a slide-on connector 176a and 176b that is received within a complementary connector part 194 (see FIG. 6a) formed or mounted on the vehicle in the vicinity of the roof rail. If the rail is long and might have a tendency to sag in the middle, the mounting rail may additionally include another connector part or center bracket 178 (see FIG. 3) which may integrally extend from or is connected to the center portion 172, discussed in greater detail below, to provide added center support.

Figure 6A:
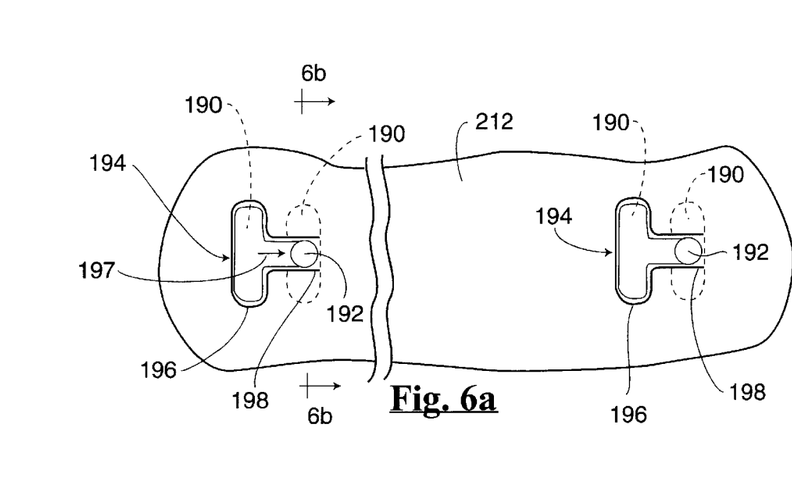
FIG. 6a shows a quick-connect feature.

Each quick-connect connector 176a and 176b includes a plate 190 which extends above and below a respective end 174a or 174b providing a T-shaped configuration to the ends of the rail 170. As can be seen in FIG. 3, the plate 190 is rectangularly or oval shaped and extends above and below the centerline of the rail 170. The T-shape configuration of the end/plate prevents the rail 170 from rotating up or down on its mounting location. In one embodiment, each extending end 174a and 174b is formed as or with a short cylinder or a pin 192 which links the rail 170 to each plate 190. The mating connector includes a keyhole slot 194 formed in an adjacent vehicle part such as in the roof rail 212. FIG. 6a shows keyhole slots 194 associated with ends 174a and 174b of the rail 170. Each keyhole slot 194 is formed, for example, in a portion of the roof rail 212 and includes a large opening 196 and a narrow opening 198 which extends from the large opening 197. The large opening is of a similar shape to plate 190 but slightly oversized to receive plate 190. The width of the narrow opening 198 is slightly wider than the diameter of the pin 192.

Figure 6B:
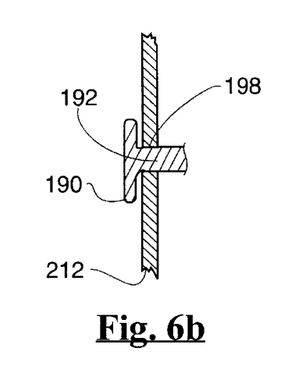

Prior to mounting the mounting rail 170 to the roof rail, it is slid within the upper tubular portion 46 of the air bag. The tubular portion 46 is created by sewing the two facing sides 70 and 72 at seams 49 and 51. In this configuration, the ends 174a and 174b extend out of respective ends of the tubular portion 46. Thereafter, each rail plate 190 is first positioned within the larger portion 196 of the respective keyhole slot 194 and the rail is slid sideways, see arrow 197, to position the pin 192 in the respective smaller portion 198 of the keyhole slot. FIG. 6b is a cross-sectional view showing the relationship of the pin 192, plate 190 and slot portion 198. As can be appreciated, the configuration provides for the very rapid installation of the air bag to the vehicle. The rail 170 is laterally stabilized or held in position to prevent it from moving out of the keyhole slots. As an example, the rail can be stabilized by a locking mechanism associated with the keyholes 194 or with the center bracket 178, if used.

One example of a locking mechanism can be achieved by narrowing an end portion 199 of the narrow part 198 of at least one of the keyhole openings 194. As the associated pin 192 is forcibly moved within the narrow opening 198, the pin becomes press-fit relative to the narrowed end 199 thereby maintaining the rail 170 in place.

As mentioned earlier, the rail 170 may include a center bracket such as 178 to support the center of the rail 170. The center bracket 178 and portion of the roof rail may cooperate to affect a locking mechanism 300. In one embodiment, the center bracket 178 includes a short pin or extension 192a and a plate 301 that extends upwardly from the pin 192a.

Figure 6C:
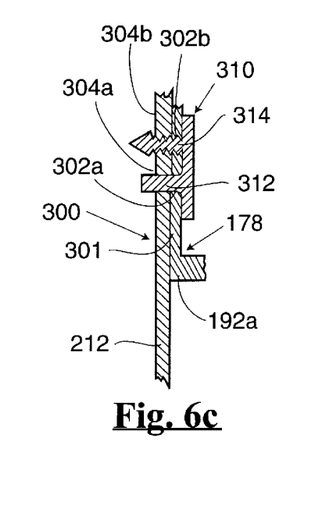
FIG. 6c is a cross-sectional view through Section 6c—6c of FIG. 6.
Figure 6D:
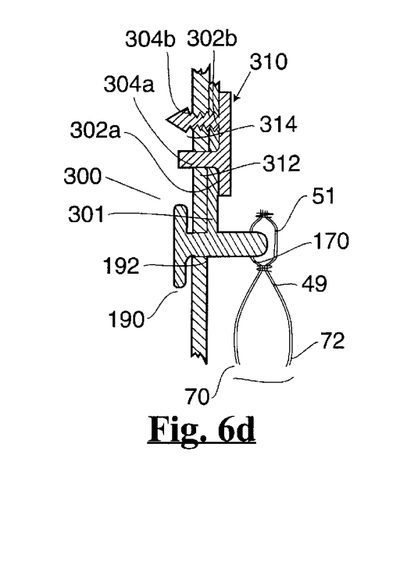
FIG. 6d shows a cross-sectional view of an alternate embodiment of the invention.

The plate includes a first and second opening 302a and 302b (also shown in FIG. 6c). Similarly sized openings 304a and 304b are provided in the vehicle structure. The locking mechanism 300 (including the openings 302a,b and bracket 187) may additionally include a lock member 310 which includes an alignment pin 312 received through one of the openings 302a or 302b and a friction fastener 314 such as a Christmas tree fastener received within the other of opening 302a or 302b. As can be appreciated, if the center plate 178 is not used, the plate 301 can be formed on either of the pins 192 associated with ends 174a or 174b as shown in FIG. 6d. It should also be appreciated that the pin 213 and fastener can be formed as an integral part of plate 301 thereby incorporating the function of lock member 310. Additionally, the center connector 178 can be formed by an additional keyhole opening 194 and associated pin 192 and plate 190 generally located in the center of the rail 170.

Figure 12:
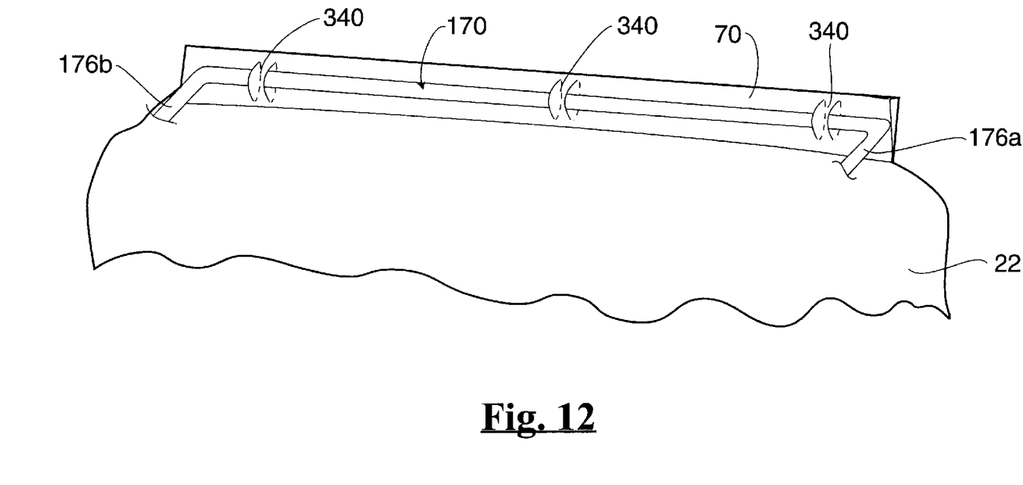
FIG. 12 shows still another embodiment of the invention.

Reference is briefly made to FIG. 12, which shows a further embodiment of the invention. In the above embodiment, the rail 170 is received through the tube 46. As shown in FIG. 12, loops 340 are formed at or near the top of rear panel 70 of the air bag 22. In this embodiment, the rail 170 is slipped through each discrete loop 340 to support the air bag 22.

Figure 7:
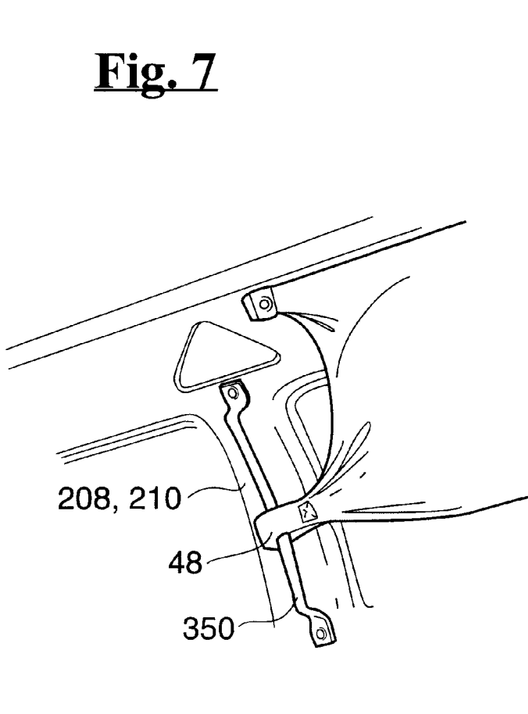
FIGS. 7 and 7a illustrate a rear tether mounting arrangement.
Figure 7A:
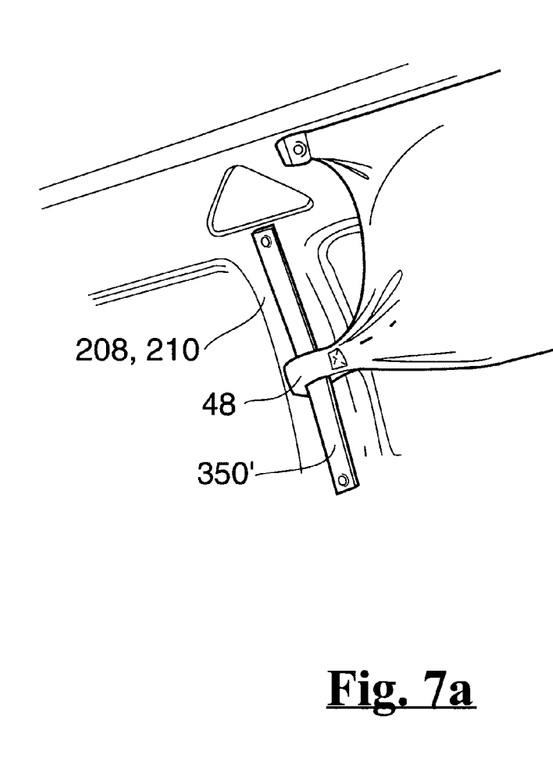

As may be recalled from the description above, the tether associated with the lower corner 46a of the air bag can be formed as a strap or alternatively, formed as loop 48. Reference is briefly made to FIGS. 7 and 7a, which illustrate the mounting arrangement for the looped tether. The loop 48 is received about a mounting bar 350 secured at its top and bottom to a respective pillar, or alternatively as shown in FIG. 7a, the loop 48 is received about a flexible mounting strap 350' similarly secured at its end to a pillar. It should be appreciated that if the air bag 22 is not particularly wide, the pillar, on which the bar 350 or strap 350' is mounted, can be the B-pillar 208 or if the bag is sufficiently wide, the pillar can be the C-pillar 210.

From FIG. 6 it can be seen that prior to deployment, the air bag 22 is situated in a folded or rolled configuration along the roof rail (as also indicated in FIG. 1). Upon energization of the inflator, the cushion deploys downwardly from the roof rail, bending the edge 236 (for the left-hand curtain) or bending edge 236a (for the right-hand curtain) of the trim or roof liner. The deployed air bag 22 is also shown by phantom lines. In its deployed state, the air bag 22 covers the front side and rear side windows 230 and may extend down to cover the top of the window sill 231, which may be part of a door or inside wall of the vehicle.

Figure 8A:
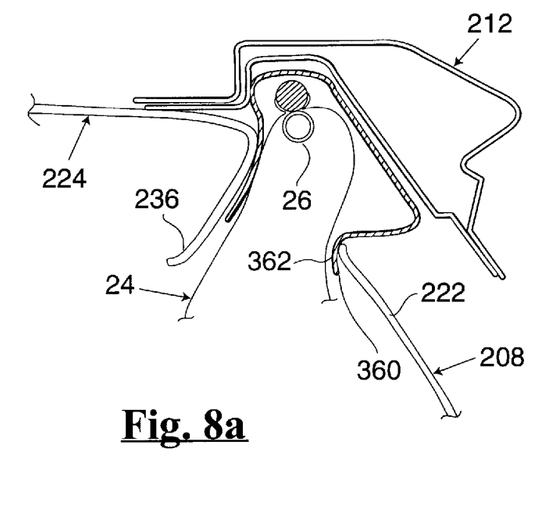

With reference to FIGS. 8 and 8a, the air bag 22 can be encased within a frangible elongated cover 360, which is used to protect the air bag during transportation and assembly. The cover 360 is packed tightly into a relatively flat shape so that the cushion can be easily stowed between the roof rail and the interior trim. The cover 360 can be made from thermoplastic, cloth, air bag fabric or paper or a semi-hard (or rigid) plastic cover which may act as a guide when the air bag deploys downwardly along the B-pillar 208 and adjacent interior part of the passenger compartment. FIG. 8a shows the cover 360 after it has been separated by the inflating air bag 22 where a portion 362 of the cover 360 overlays the pillar trim such as the B-pillar trim 222 to protect the air bag.

Figure 9:
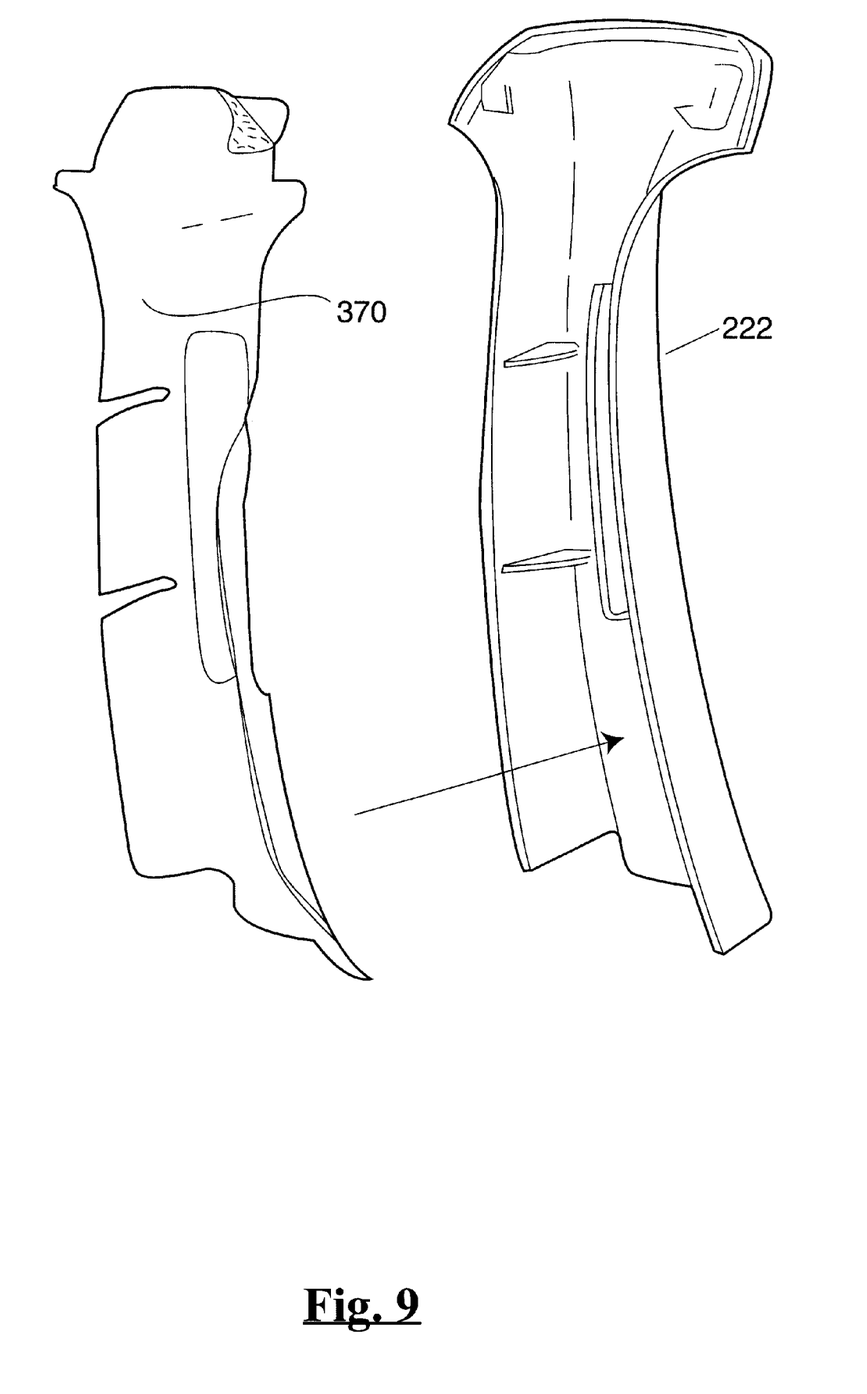
FIG. 9 shows an alternate embodiment of the invention.

Reference is briefly made to FIG. 9, which shows an alternate embodiment of the invention. During a rollover accident or a side impact accident of high severity, the occupant may move forcibly into the side of the vehicle potentially causing the interior trim components covering the various pillars to crack. This cracking can be minimized by applying an adhesive pad 370, made for example from a non-woven fiber sheet, to the inside of each trim part such as the trim covering the A, B, or C-pillars.

Figures 10, 10A:
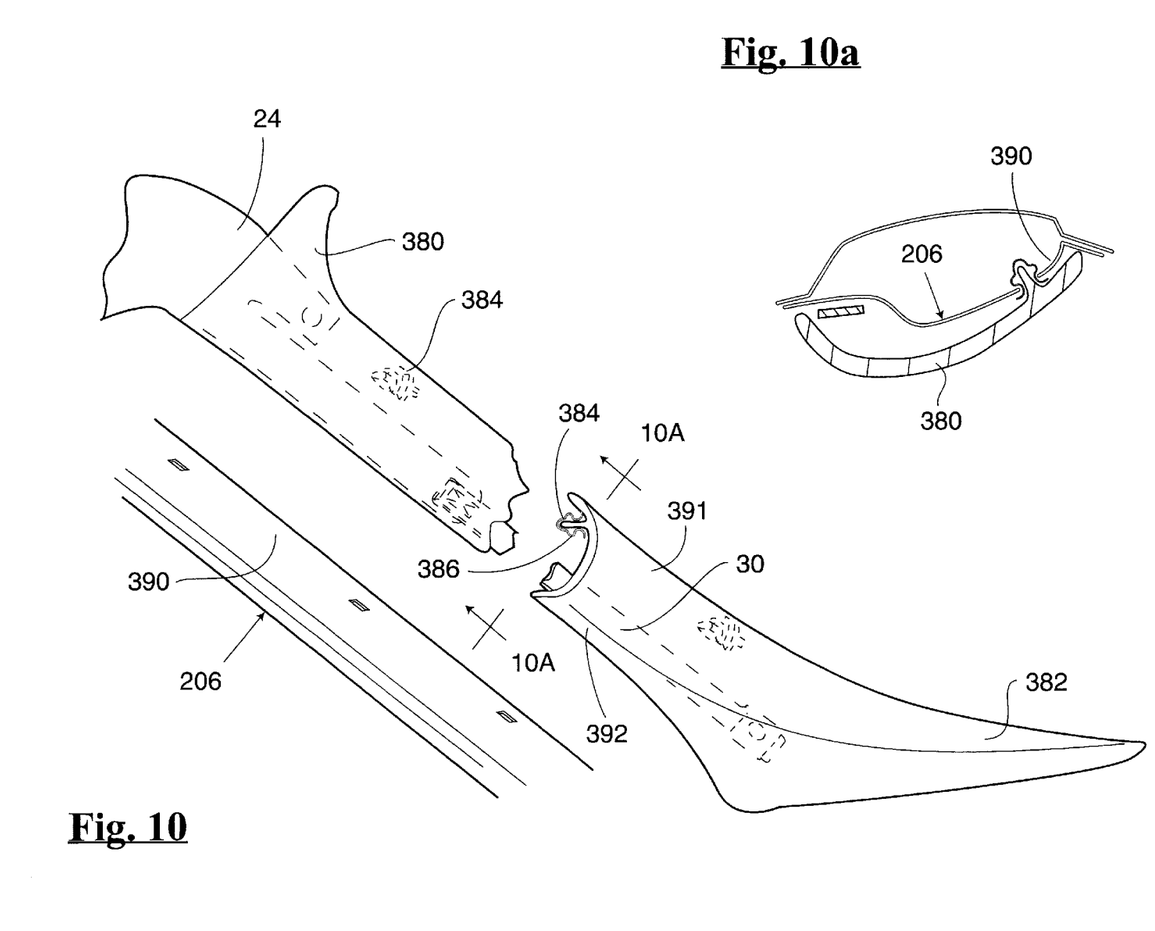
FIG. 10 shows further details of the invention in relation to the A-pillar of a vehicle.
FIG. 10a is a cross-sectional view through Section 10a—10a of FIG. 10.

Reference is made to FIGS. 10 and 10a. The A-pillar 206 is also covered by a trim part designated as 380. This trim part follows the contours of the A-pillar and is generally semicircular or oval in cross-section. The lower portion 382 of the trim 380 extends to provide a smooth transition to the instrument panel (not shown) proximate the windshield. One such trim part 380 is used on each A-pillar of the vehicle. Prior to deployment, the trim 380 hides a portion of the air bag 22 and the associated forward tether 30 (or 30'). The trim 380 is secured to the A-pillar 206 using conventional spring or snap-on fasteners such as 384 positioned about an integral post 386 formed on the underside of the trim piece 380. This trim piece may also include an adhesive pad such as 370 secured to its back to prevent cracking or fragmentation. The location of the trim fastener 386, however, is important so that it does not slow down and deflect the inflation of the air bag and more particularly does not impede those portions of the air bag initially encased within the trim from moving outwardly. It is preferred to mount the interior trim piece 380 to an upper edge 390 (adjacent to the windshield) of the pillar 206 above the encased air bag components. The fasteners 386 are arranged closer to the upper edge 391 of the trim. In this manner, the inner edge 392 of the trim piece 382 is not restrained and is permitted to flex outwardly on deployment of the air bag permitting the air bag and tether strap to egress between the pillar and the trim.

Many changes and modifications in the abovedescribed embodiment of the invention can, of course, be carried out without departing from the scope thereof. Accordingly, that scope is intended to be limited only by the scope of the appended claims.

What is claimed is:

1. An air bag assembly (20) comprising:
   an air bag (22) having at least one inflatable portion (40); and a tubular connecting portion (48, 340) located above the inflatable portion and formed by material of the air bag;
   a mounting rod (170), received through the connecting portion to support the air bag, the mounting rod including opposing ends, each end including an end connector adapted to be connected to a cooperating part of a vehicle, the connectors providing the primary support for the mounting rod and air bag.

2. The assembly as defined in claim 1 wherein each end connector includes connector means for quickly and easily mounting the rod to the vehicle.

3. The assembly bag as defined in claim 2 wherein the connector means includes a first connector on one of the respective ends of the rod or the vehicle, and a mating second connector on the other of the ends of the rod or the vehicle.

4. The assembly as defined in claim 3 wherein the first connector includes a pin (192, 192a) and plate (190) and wherein the second connector includes a keyhole opening (194) comprising an interconnected small diameter opening and a large diameter opening.

5. The assembly as defined in claim 3 including lock means (197, 300) for prohibiting the first and second connectors from disconnecting.

6. The assembly as defined in claim 1 wherein the air bag (22) further includes an inlet (44) and a distribution tube (26), received within the inlet, for distributing inflation gas from a source of inflation (24), to the inflatable portion, wherein the inlet and distribution tube are generally located adjacent a top of the inflatable portion.

7. The assembly as defined in claim 6 further including a source of inflation gas communicated to one end of the distribution tube (26) proximate the inlet of the air bag.

8. The assembly as defined in claim 6 wherein the source of inflation is an air bag inflator (24) having at least one exit port (122) arranged in the inflator to distribute inflation gas axially into an inlet end of the tube.

9. The assembly as defined in claim 1 wherein the center section of the mounting rod (170) is shaped to conform to an adjacent portion of the vehicle.

10. An air bag assembly (20) comprising:
an air bag (22) having at least one inflatable portion (40);
a connecting portion (48, 340) located above the inflatable portion;
a mounting rod (170) supporting the air bag via the connecting portion, the mounting rod including opposing ends adapted to be connected to a cooperating part of a vehicle;
wherein the air bag (22) includes:
a plurality of inflatable cushion portions (40a, 40b, 40c) adapted to be stored at a location at or near a roof rail of a vehicle and when inflated lies generally against a side of the vehicle to protect an occupant of the vehicle, the air bag having a top and bottom, an interior side and an exterior side, and a first and a second end, the air bag being wide enough to extend from about the location of a first pillar of the vehicle to about a second pillar of the vehicle; and
a first inflatable portion located proximate the first end and a second inflatable portion located proximate the second end, an uninflatable portion situated between the first and second inflatable portions and a third inflatable portion situated below the uninflatable portion;
wherein the third portion includes a common manifold in communication with the first and second inflatable portions, the manifold situated below the uninflatable portion, the third portion further including a plurality of cells, each cell having at least a partially open top in communication with the manifold and an enclosed bottom.

11. An air bag assembly (20) comprising:
an air bag (22) having at least one inflatable portion (40) and an inlet (44) for distributing inflation gas from a source of inflation (24) to the inflatable portion, wherein the inlet is generally located adjacent a top of the inflatable portion;
wherein the source of inflation is an air bag inflator (24) having at least one exit port (122) arranged to permit inflation gas to leave the inflator in a non-axial direction and further including a diverter (150), having at least one axially arranged exit port (158), secured about the inflator exit port and connected to the inlet to change the direction of flow of the inflation gas from non-axial to axial prior to entering the air bag.

12. The assembly as defined in claim 11 wherein a remote end of the air bag is slidable relative to a support member.

13. The assembly as defined in claim 11 wherein the support member is one of a mounting bar and mounting strap.

14. An air bag assembly (20) comprising:
a curtain air bag (22) having at least one inflatable portion (40);
a self-supporting curtain rod (170) having opposing ends, for supporting the air bag;
mounting means, located at each opposing end, for mounting the curtain rod, at the ends thereof, to a cooperating structure;
wherein the curtain rod is received within a cooperating portion of the airbag.

15. The assembly as defined in claim 14 wherein the mounting means includes a quick-connect, quick-disconnect device comprising an interconnected small diameter opening and a large diameter opening.

16. The assembly as defined in claim 14 wherein the mounting means is adapted to mount to a cooperating portion of a vehicle.

17. The assembly as defined in claim 16 wherein the air bag is sufficiently wide that, when inflated, it extends at least between two pillars of the vehicle.

18. An air bag assembly (22) having a plurality of inflatable cushion portions (40a, 40b, 40c), the air bag adapted to be stored at a location at or near a roof rail of a vehicle and when inflated lies generally against a side of the vehicle to protect an occupant of the vehicle, the air bag having a top and bottom, an interior side and an exterior side, and a first and a second end, the air bag being wide enough to extend from about the location of a first pillar of the vehicle to about a second pillar of the vehicle;
wherein a first inflatable portion is located proximate the first end of the cushion and a second inflatable portion is located proximate the second end, an uninflatable portion is situated between the first and second inflatable portions and a third inflatable portion is situated below the uninflatable portion;
wherein the third portion includes a common manifold in communication with the first and second inflatable portions, the manifold situated below the uninflatable portion, the third portion further including a plurality of cells, each cell having at least a partially open top in communication with the manifold and an enclosed bottom.

19. An air bag assembly (20) comprising:
an air bag (22) having at least one inflatable portion (40); and a tubular connecting portion (48, 340) located above the inflatable portion and formed by material of the air bag;
a mounting rod (170), received through the connecting portion to support the air bag, the mounting rod including opposing ends, each end including an end connector adapted to be connected to a cooperating part of a vehicle, at least one of the end brackets having a T-shaped configuration, received within a cooperating opening of the vehicle to prevent the rod from twisting.

20. The assembly as defined in claim 19 wherein the T-shaped configuration is formed by a plate secured to a rod end.

21. An air bag assembly (20) comprising:
an air bag (22) having a plurality of inflatable cushion portions (40a, 40b, 40c), the air bag adapted to be stored at a location at or near a roof rail of a vehicle and when inflated lies generally against a side of the vehicle to protect an occupant of the vehicle, the cushion having a top and bottom, an interior side and an exterior side, and a first and a second end, the cushion being wide enough to extend from about the location of a forward first pillar of the vehicle to about a rearward second pillar of the vehicle;

wherein a first inflatable portion is located proximate the first end of the cushion and a second inflatable portion is located proximate the second end, an uninflatable portion is situated between the first and second inflatable portions and wherein the first end is securable via a first tether to the first pillar and wherein the second end includes a second tether slidably mountable to one of a strap and rod.

22. The assembly as defined in claim 21 wherein one end of the second tether is formed as a loop to envelop one of the strap and rod.

* * * * *